United States Patent [19]
Vincent et al.

[11] 3,901,596
[45] Aug. 26, 1975

[54] LASER TELEMETER

[75] Inventors: Daniel Vincent, Antony; Pierre Trevoux, Chatenay-Malabry, both of France

[73] Assignee: Compagnie Generale d'Electricite, Paris, France

[22] Filed: Apr. 25, 1973

[21] Appl. No.: 354,422

[30] Foreign Application Priority Data
Apr. 27, 1972 France .................... 72.15038

[52] U.S. Cl. .................... 356/4; 250/205; 350/314; 350/315; 356/5
[51] Int. Cl. .......................... G01c 3/08; G02b 5/22
[58] Field of Search .............. 356/4, 5, 28; 250/205; 350/314, 315; 353/55

[56] References Cited
UNITED STATES PATENTS
3,041,924  7/1962  Strass ................................ 350/314
3,669,540  6/1972  Rattman et al. ..................... 356/4
3,700,314  10/1972  Busby, Jr. ........................... 350/314
3,779,645  12/1973  Nakazawa et al. .................. 356/4

Primary Examiner—Maynard R. Wilbur
Assistant Examiner—S. C. Buczinski
Attorney, Agent, or Firm—Sughrue, Rothwell, Mion, Zinn & Macpeak

[57] ABSTRACT

Laser telemeter comprising an attenuator a portion of which is placed on the trajectory of the pulses emitted by the laser and partially absorbs the energy of these pulses. This attenuator comprises several zones which are substantially centred on an axis, the absorbed fraction of the energy of a pulse being different for the various zones of the attenuator. That telemeter comprises also means for shifting that portion on the attenuator and means for driving the attenuator in a rotating movement about its axis.

7 Claims, 6 Drawing Figures

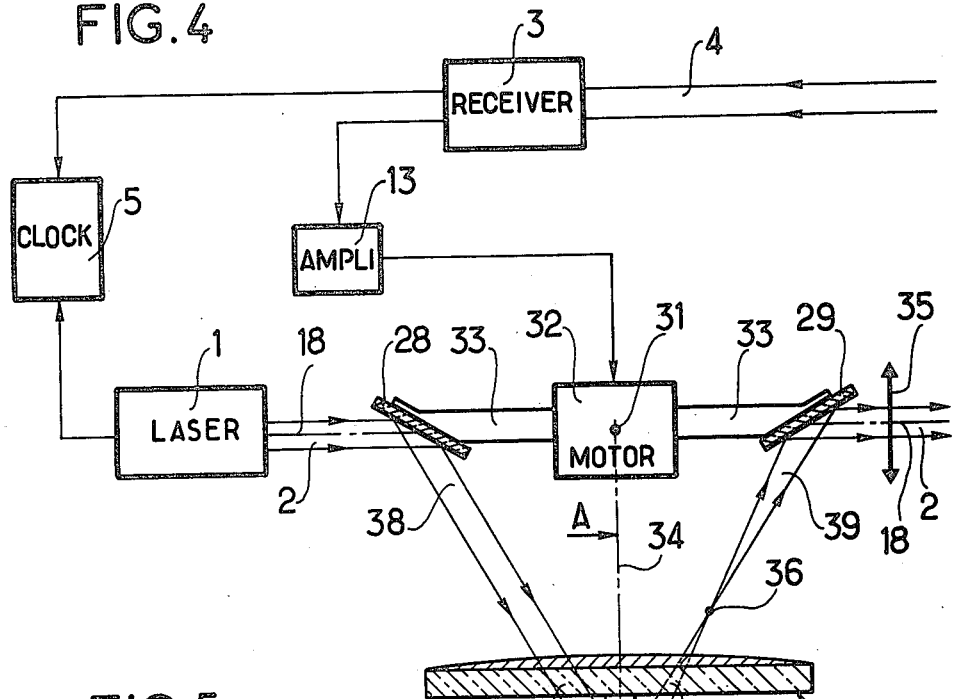
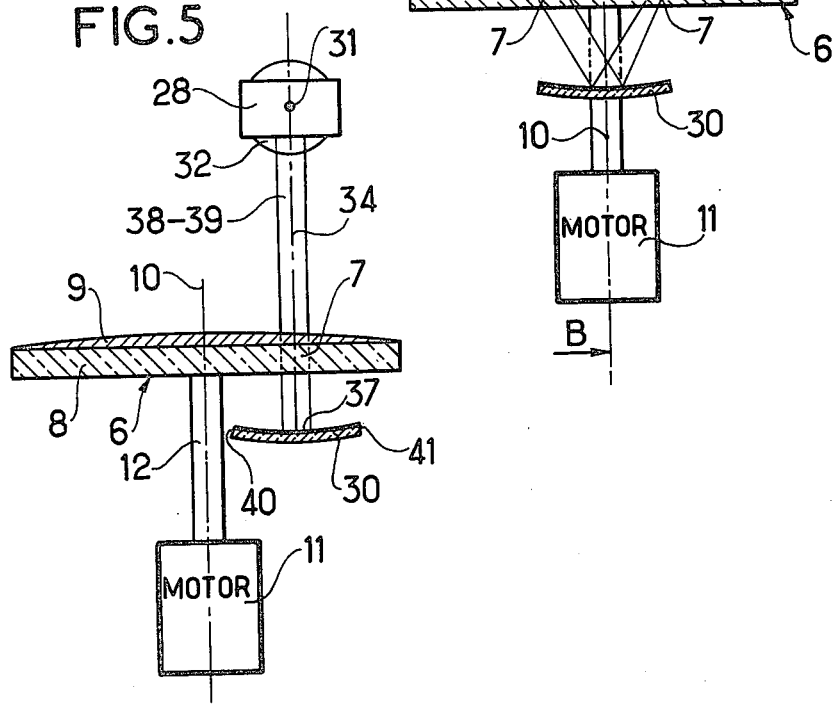

LASER TELEMETER

The present invention concerns telemeters and more particularly laser telemeters.

A laser telemeter intended for measuring the distance of a target comprises a laser generator capable of emitting a succession of light pulses towards that target, a photosensitive receiver for receiving the light pulses sent back by the target and a device connected to the laser generator and to the photosensitive receiver for measuring the interval of time comprised between the emitting of each of these pulses and the receiving thereof at the receiver. That interval of time is proportional to the distance of the telemeter from the target.

When that telemeter is pointed towards a target which moves in relation to it, the energy of the pulses which reach the receiver may vary in considerable proportions, this causing a great reduction in the accuracy of telemetry. To overcome that disadvantage, certain known laser telemeters comprise an attenuator which may be controlled, placed at the output of the laser generator. The attenuator is composed of a disk of transparent material which may rotate about its axis of symmetry. Several juxtaposed metallic layers of variable thickness are arranged on one face of that disk. Each of these layers takes up a circular sector of the disk and absorbs a fraction of energy of the pulses emitted by the laser generator, that fraction being different for the various layers of the disk. That telemeter comprises, moreover, servo-control means controlled as a function of the signals sent out by the receiver and controlling the rotating of the attenuator disk so as to keep the energy of the pulses received on the receiver substantially equal to a pre-determined value.

Laser telemeters comprising an attenuator of that type have a disadvantage when the average power of the pulses emitted by the laser generator is high.

Indeed, for slow movements of the target in relation to the telemeter, the attenuator disk rotates at a very low speed and the metallic layers deposited on the disk are evaporated by the energy of the laser pulses, this causing the attenuator to be put out of action.

The present invention aims at overcoming that disadvantage.

The object of the present invention is a telemeter for measuring the distance of a target, comprising:

A generator capable of emitting a succession of light pulses along a first axis towards the said target;

An attenuator one portion of which is placed on the trajectory of the said pulses and absorbs partly the energy of the said pulses, that attenuator comprising several zones such that the fraction of the energy of a pulse absorbed by the said portion be the same when that portion takes up various positions in one of these zones, that fraction being different for the various zones of that attenuator;

A photosensitive receiver for receiving the light pulses sent back by the said target;

Servo-control means controlled by the said photosensitive receiver and controlling the position of the said portion on the said attenuator so as to be able to move the said portion from one of the said zones to the other and to keep the energy of the light pulses received by that photosensitive receiver substantially equal to a pre-determined value;

Means for making the said attenuator rotate about a second axis connected to that attenuator;

And means, connected to the said generator and to the said photosensitive receiver, for measuring the interval of time comprised between the leaving of each of the said pulses and the receiving thereof on that photosensitive receiver, characterised in that Each of the said zones of the attenuator is centered about the said second axis;

And that the said servo-control means are means for moving, on the said attenuator, the said portion in a direction perpendicular to the said second axis.

The invention will be better understood from the following description given with reference to the accompanying drawing by way of illustration but having no limiting character, in which:

FIG. 4 is a diagram of a third embodiment of the telemeter according to the invention;

FIG. 5 is a part view of the telemeter shown in FIG. 4 cut-away along the plane AB shown in FIG. 4;

Figure 1:
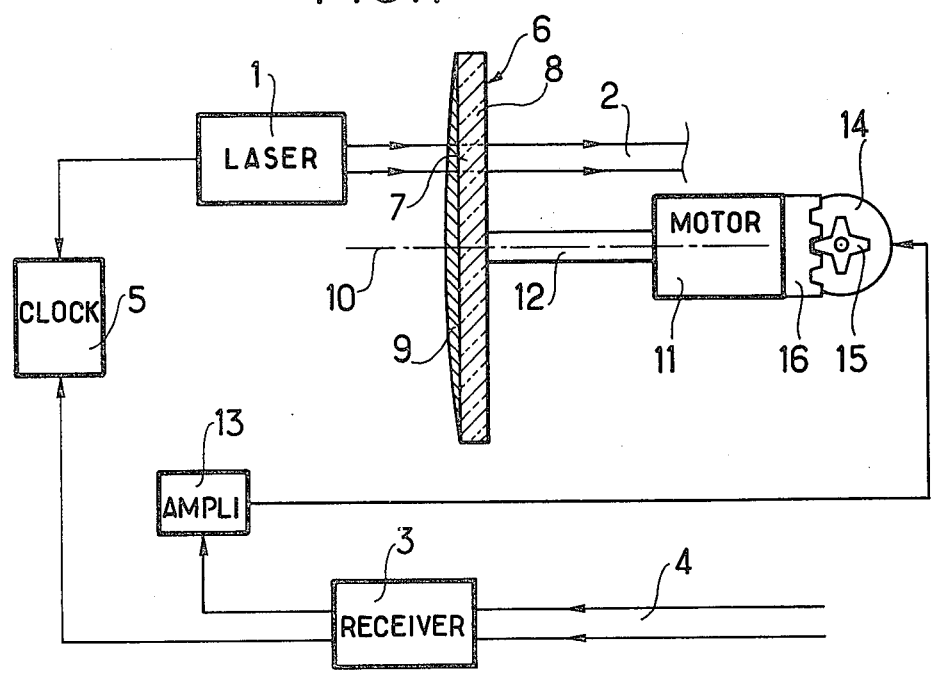
FIG. 1 shows diagrammatically an embodiment of the telemeter according to the invention.

FIG. 1 shows diagrammatically a first embodiment of the telemeter according to the invention. That telemeter comprises a light generator 1 such as a laser generator capable of emitting a succession of light pulses 2 towards a target, not shown, a photosensitive receiver 3, such as a silicon photodiode, arranged beside the generator 1 for receiving an echo 4 of the light pulses sent back by the target and a device 5 connected to the generator 1 and to the receiver 3 to measure the interval of time comprised between the emitting of each of the pulses and the receiving thereof on the receiver 3.

This telemeter comprises, moreover, an attenuator 6 centred on an axis 10 and whose portion 7 is placed on the trajectory of a pulse 2. That attenuator 6 may be composed, as shown in the figure, of a disk 8 made of a transparent substance such as glass; a metallic layer 9 whose thickness varies in the same direction, for example, decreasing, from the centre to the edge of the disk 8 is deposited on one face of that disk.

That telemeter comprises means for driving the attenuator 6 in a rotating movement on its axis 10, these means being constituted, for example, by an electric motor 11 whose shaft 12 is connected mechanically to the disk 8; that motor 11 is fed by an electric power source which is not shown.

Lastly, that telemeter comprises servo-control means controlled by the receiver 3 and controlling the moving of the portion 7 on the attenuator 6 in a direction perpendicular to the axis 10, to keep the energy of the light pulses received by the receiver 3 substantially equal to a pre-determined value.

In the case illustrated by FIG. 1, these means comprise a device 13 comprising, for example, a generator of a reference voltage, a comparator and an amplifier, that device 13 being connected up to the receiver 3 and to an electric motor 14 driving in a rotating movement a pinion 15 which meshes with a rack 16 fast with the motor 11.

Figure 2:
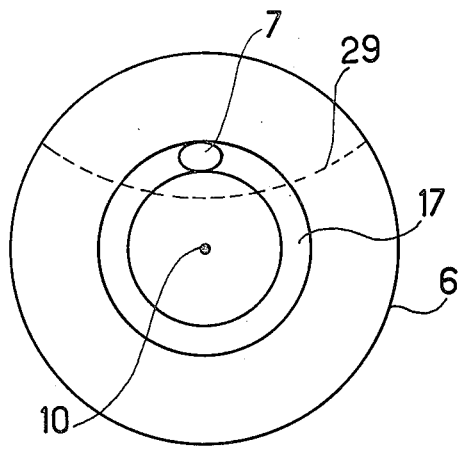
FIG. 2 is a plan view of an element of the telemeter, shown in a cross-section view in FIG. 1.

FIG. 2 is a plan view of the attenuator 6 shown in a cross-section view in FIG. 1. That FIG. 2 shows a zone 17 of that attenuator 6 constituted by a circular crown centred on the axis 10 and limited by two circles which are tangent at the periphery of the surface of the portion 7 of the attenuator 6 crossed by the pulses 2. That zone 17 is such that the fraction of the energy of a pulse absorbed by the portion 7 is the same when that portion 7 takes up various positions in that zone 17. The attenuator 6 comprises several zones such as the zone 17, according to the position of the portion 7 on the attenuator 6; the fraction of energy absorbed is different for the various zones of that attenuator.

The telemeter shown in FIGS. 1 and 2 operates as follows:

On receiving the echo 4, the photosensitive receiver 3 sends out an electric signal whose voltage is representative of the energy of the pulse received. The voltage of that signal transmitted to the device 13 is compared with the reference voltage of that device 13. The comparator of the device 13 then sends out a positive or negative error signal. That reference voltage corresponds to the pre-determined value of the energy of the pulses received by the receiver 3. The amplifier of the device 13 amplifies that error signal to feed the motor 14 so as to cause, by means of the pinion 15, the rack 16 and the motor 11, the moving of the attenuator 6 in relation to the axis of the pulses 2 in a direction which tends to decrease the error signal. For example, if the signal sent out by the receiver 3 is greater than the reference voltage, the moving of the attenuator 6 is effected in a direction which tends to bring the portion 7 of the attenuator 6 closer to the axis 10, that is, to attenuate even further the energy of the pulses 2. Indeed, the attenuation of the energy of the pulses 2 is all the greater the more the metallic layer 9 crossed by these pulses is thick.

Moreover, the motor 11 drives the attenuator 6 in a rotating movement on its axis 10, for example at a constant speed. In these conditions, even in the case where the motor 14 does not rotate, that is, in the case where the distance from the target to the telemeter is substantially constant, the portion 7 of the attenuator 6 moves constantly along the zone 17. The heat energy absorbed by the portion 7 is distributed over the whole surface of the zone 17 and the metallic layer 9 deposited on the disk 8 is not evaporated by the energy of the pulses 2 even when the average power sent out by the generator 1 is high.

The time taken by each pulse between the emitting thereof and the receiving thereof is calculated by means of the device 5; the value of the distance from the telemeter to the target may be, for example, displayed by digital means on the device 5.

Nevertheless, that first embodiment of the telemeter according to the invention described and illustrated in FIGS. 1 and 2 has a disadvantage: the servo-control device 13 has a fairly long response time, due to the relatively great mass to be moved (attenuator 6, motor 11 and rack 16).

Figure 3:
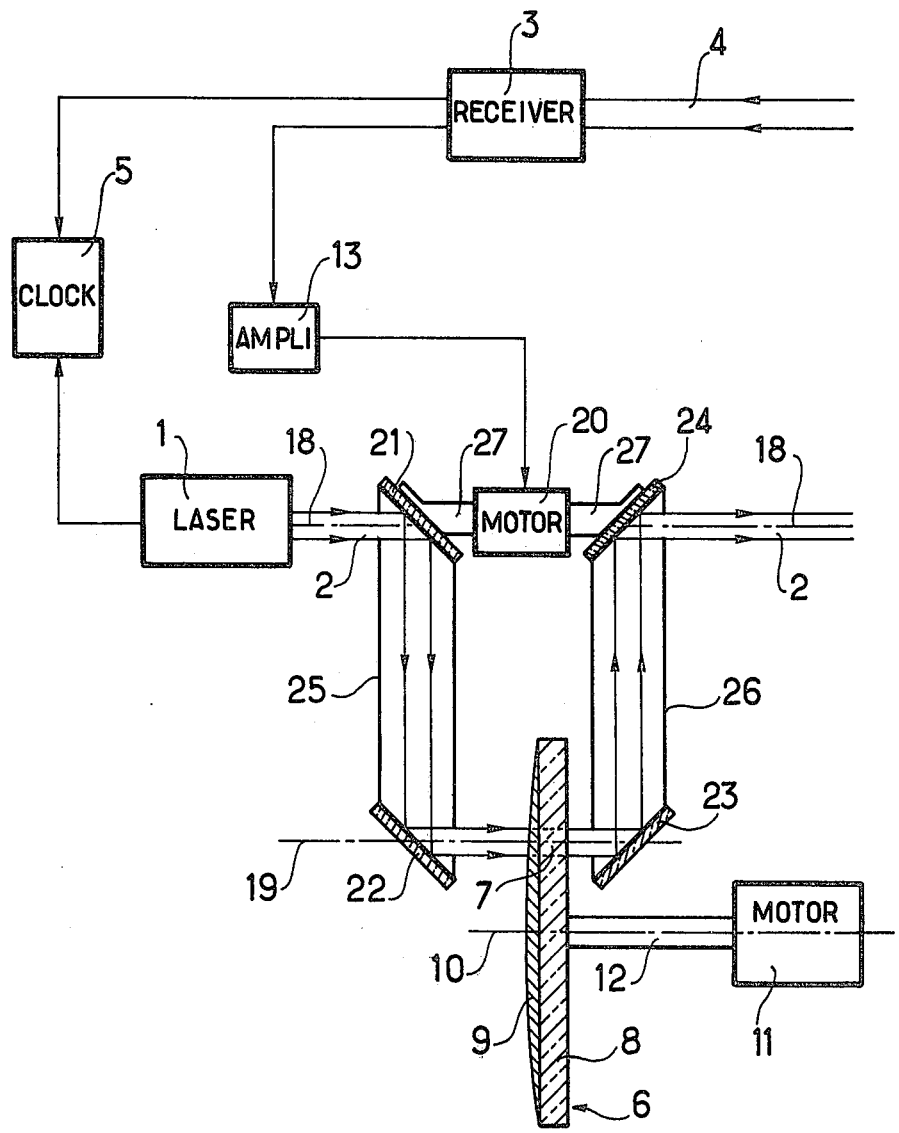
FIG. 3 is a diagram of a second embodiment of the telemeter according to the invention.

FIG. 3 shows diagrammatically a second embodiment of the telemeter according to the invention, better adapted to the case where the target aimed at by that telemeter moves at high speed. That figure shows a telemeter comprising a light generator 1 capable of emitting a succession of light pulses 2 along an axis 18 towards a target, not shown, a photosensitive receiver 3 for receiving an echo 4 of the light pulses sent back by the target and a device 5 connected to the generator 1 and to the receiver 3 for measuring the interval of time comprised between the emitting and the receiving of each of the light pulses. This telemeter comprises, moreover, an attenuator 6 identical to the attenuator shown in FIGS. 1 and 2 and a motor 11 driving that attenuator 6 in a rotating movement about its axis 10. A portion 7 of that attenuator 6 is placed on the trajectory of the pulses 2. That device comprises servo-control means controlled by the receiver 3 and controlling the moving of the portion 7 on the attenuator 6 in a direction perpendicular to the axis 10, to keep the energy of the light pulses received by the receiver 3 substantially equal to a predetermined value.

In the case illustrated in FIG. 3, these servo-control means comprise a device for deviating the pulses emitted by the generator 1, these pulses being deviated by the axis 18 on a part of their trajectory. This deviating device comprises two plane reflectors 21 and 24 placed on the axis 18 and limiting the deviated part of the trajectory of the pulses and two plane reflectors 22 and 23 placed on an axis 19 different from the axis 18. These four plane reflectors are fast mechanically with one another and are driven in a rotating movement on the axis 18 by a motor 20. For example, two metallic supports 25 and 26 connect, respectively, on the one hand, the reflectors 21 and 22 and, on the other hand, the reflectors 23 and 24, each of the reflectors 21 and 24 being fixed to the two ends of the shaft 27 of the motor 20. The portion 7 of the attenuator 6 is placed on the deviated trajectory of the light pulses between the reflectors 22 and 23. The light pulses emitted by the generator 1 are reflected successively on the reflectors 21, 22, 23 and 24. As shown in the figure, the planes of the reflectors 21 and 24 may be inclined at 45° to the axis 18 and perpendicular to one another; the planes of the reflectors 22 and 23 may be respectively parallel to those of the reflectors 21 and 24. These servo-control means comprise, moreover, a device 13 connected to the receiver 3 and to the motor 20, that device 13 being similar to that having the same reference shown in FIG. 1.

The operation of the telemeter shown in FIG. 3 is similar to that of the telemeter shown in FIG. 1. But in the case illustrated in FIG. 3, the motor 11 remains stationary and the axis 19 of the deviated light pulses moves, by means of the motor 20, in relation to the attenuator 6 causing the moving of the portion 7 on the attenuator 6 in a direction perpendicular to the axis 10. The portion 7 then describes on the attenuator 6 the arc of a circle such as 29 (FIG. 2) crossing through the various zones of that attenuator. As in the case of FIG. 1, the attenuator 6 rotates on the axis 10 by means of the motor 11, this enabling the evaporation of the metallic layer 9 deposited on the disk 8 to be prevented. The deviating device driven in a rotating movement by the motor 20 as shown in FIG. 3 has a slighter inertia than the motor 11 and the attenuator 6 as a whole, shown in FIG. 1, this causing a shorter response time of the servo-control means. This telemeter is therefore better adapted than that shown in FIG. 1 in the case where the target moves at high speed.

FIG. 4 shows diagrammatically a third embodiment of the telemeter according to the invention. That figure shows a telemeter comprising a light generator 1, capable of emitting a succession of light pulses 2 towards a target along an axis 18, a photosensitive receiver 3 for receiving an echo 4 of these pulses and a device 5 similar to the device bearing the same reference shown in FIG. 1. That telemeter comprises, moreover, an attenuator 6 identical to the attenuator shown in FIGS. 1 and 2, a portion 7 of which is placed on the trajectory of the light pulses and a motor 11 for driving the attenuator 6 in a rotating movement on its axis 10. That telemeter comprises, like the telemeters shown in FIGS. 1 and 3, servo-control means comprising a device 13 controlled by the receiver 3 and controlling the moving of the portion 7 on the attenuator 6 in a direction perpendicular to the axis 10, to keep the energy of the pulses received on the receiver 3 substantially equal to a predetermined value. These servo-control means comprise, as in the case illustrated by FIG. 3, a device for deviating the pulses emitted by the generator 1, these pulses being deviated from the axis 18 on a part of their trajectory. This deviating device comprises two plane reflectors 28 and 29 placed on the axis 18 and limiting the deviated part of the trajectory of the pulses and a concave spherical reflector 30 whose centre 31 is placed on the axis 18 between the reflectors 28 and 29. The reflectors 28 and 29 are fast mechanically with one another and are driven in a rotating movement about the axis 18 by a motor 32 which is itself controlled by the device 13. For example, each of the reflectors 28 and 29 is fixed to the two ends of the shaft 33 of the motor 32. The portion 7 of the attenuator 6 is placed on the deviated trajectory of the light pulses between the reflectors 28 and 29, on the one hand and the spherical reflector 30 on the other hand. The pulses emitted by the generator 1 are reflected successively by the reflectors 28, 29 and 30. As shown in FIG. 4, the axis 34 of the spherical reflector 30 can cut the axis 18 perpendicularly at the point 31, the reflectors 28 and 29 being arranged symmetrically in relation to that axis. The deviating device comprises, moreover, a convergent optical system 35 centred on the axis 18 and situated on the other side of the reflector 29 in relation to the reflector 28. The focus of the optical system constituted by the convergent optical system 35 and the reflector 29 is placed at the focus point 36 of the pulses concentrated by the spherical mirror 30.

FIG. 5 is a part view of the telemeter shown in FIG. 4, cut away along a plane AB (FIG. 4) perpendicular to the axis 18. That figure shows the respective arrangement of the attenuator 6 and of the deviating device, the axis 10 of the attenuator 6 possibly being, as shown, parallel to the axis 34 of the mirror 30.

The operation of the telemeter illustraated in FIGS. 4 and 5 is as follows. When the motor 32 is controlled by the device 13 drives the two plane reflectors 28 and 29 in a rotating movement, the trace 37 (FIG. 5) on the spherical reflector 30 of deviated light pulses 38 and 39 describes an arc 40, 41 of a large circle of the reflecting surface of the reflector 30. In these conditions, the portion 7 is moved on the attenuator 6 perpendicular to its axis 10 and crosses the various zones of that attenuator. As in the case illustrated in FIG. 3, the rotating of the attenuator 6 about its axis 10 enables the evaporation of the metallic layer 9 deposited in a variable thickness on the disk 8 to be avoided. The aim of the convergent optical system 35, in the case where the pulses are emitted by the generator 1 are in the shape of a cylindrical beam, is to transform into a cylindrical beam the conical beam of the pulses concentrated at the focal point 36 of the spherical mirror 30.

The response time of the servo-control means of the telemeter shown in FIGS. 4 and 5 is generally shorter than that of the servo-control means of the telemeter shown in FIG. 3. Indeed, the inertia of the reflectors 28 and 29 driven in a rotating movement about the axis 18 is less than that of the deviating device composed by the four reflectors shown in FIG. 3.

Figure 6:
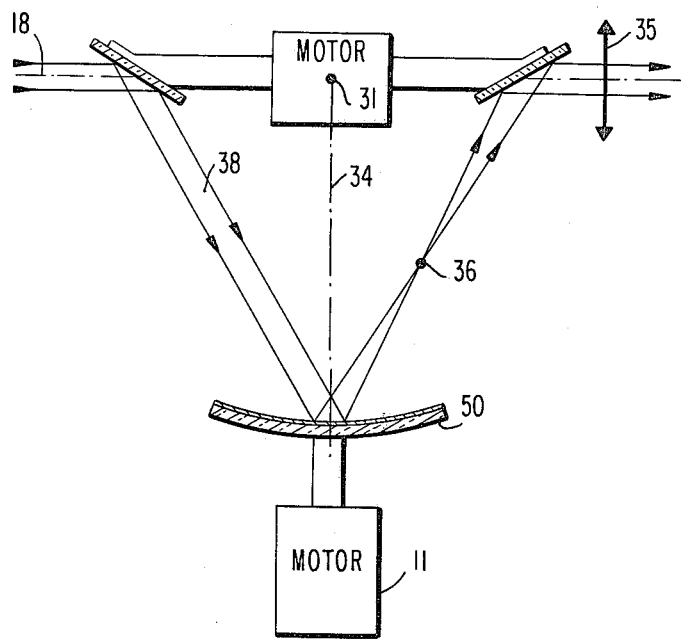
FIG. 6 is a diagram of a portion of a fourth embodiment of the telemeter according to the invention.

A fourth embodiment of the telemeter according to the invention, which is a variant of the telemeter shown in FIG. 4, is shown in FIG. 6 and differs from FIG. 4 in that the attenuator 6 is removed and the motor 11 drives the concave spherical mirror 50 in a rotating movement on its axis 34. That concave spherical mirror is then of a special type, comprising, for example, a metallic layer having a variable thickness, deposited on its reflecting surface, so as to reflect only a fraction of the energy of each pulse emitted by the generator 1. That spherical mirror constitutes an attenuator of the pulses emitted by the generator 1; its surface comprises several zones such as the zone 17, as does that of the attenuator 6 shown in FIG. 2, the reflected fraction of the energy of each pulse varying from one zone to another in the same direction, from the centre to the edge of the reflecting surface of that reflector. Besides that particularity, the telemeter as a whole corresponding to that fourth embodiment of the telemeter according to the invention, is identical to that shown in FIG. 4 and its operation is also identical.

As has been seen during the description of the telemeters described and illustrated in FIGS. 1 to 5, the pulses emitted by the telemeter according to the invention and sent back by a target reach the receiver of the telemeter with an energy substantially equal to a predetermined value, when that target moves in relation to the telemeter. That telemeter has the advantage of comprising an attenuator capable of resisting without damage a succession of light pulses having a high average power, even in the case where the telemeter is pointed at a target which moves slowly in relation to that telemeter.

I claim:

1. A laser telemeter for measuring the distance to a target, comprising:

generator means for emitting a succession of light pulses along a first axis towards the said target, said light pulses travelling along a path at least a portion of which lies along said first axis;

attenuator means, one portion of which is placed in the said path of said pulses, for absorbing partly the energy of the said pulses, said attenuator means comprising several zones such that the fraction of the energy of a pulse absorbed by the said portion is the same when that portion takes up various positions in one of these zones, said fraction being different for the various zones of said attenuator means, each of said zones being centered about an axis of said attenuator means;

photosensitive receiver means for receiving the light pulses sent back by the said target;

means, connected to the said generator and to the said photosensitive receiver, for measuring the interval of time between the leaving of each of said pulses and the reception thereof by said photosensitive receiver;

servo-control means, controlled by said photosensitive receiver, for controlling the position of the portion on said attenuator means so as to be able to move said portion from one of said zones to another to keep the energy of said light pulses received by said photosensitive receiver substantially equal to the predetermined value; and means for rotating said attenuator about said attenuator axis for causing said portion to continuously move through a zone of constant attenuation, said zone being controlled by said servo-control means.

2. The combination of claim 1, wherein said attenuator means comprises:

a disk made of a transparent substance and centered on the said attenuator axis; and a metallic layer deposited on at least one surface of said disk, each of the said zones being limited by a circular crown taking up a part of the surface of said metallic layer, the thickness of said layer varying from one zone to the other, in the same direction, from the center to the edge of said disk.

3. The combination of claim 1, wherein said attenuator means comprises a first concave spherical reflector centered on said attenuator axis for reflecting a fraction of the power of said pulses, the reflected fraction of the energy of said pulses varying from one zone to another, in the same direction, from the center to the edge of said reflector; and wherein said servo-control means comprises:

a first plane reflector and a second plane reflector placed on the said first axis and fast mechanically with one another, the said spherical reflector having a center of curvature situated on the said first axis between said first and second plane reflectors, the pulses of the said generator being reflected successively on said first plane reflector, said spherical reflector and said second plane reflector;

a convergent optical system centered on the said first axis and situated on the side of the said second plane reflector opposite to the said first plane reflector, a focal point of said optical system along said trajectory being in coincidence with a point in the focal plane of said spherical reflector; and means for driving said first and second plane reflectors in a rotating movement about said first axis.

4. The combination of claim 2, wherein the said portion of said attenuator which is in the path of said light pulses lies in said first axis and wherein said servo-control means comprises means for moving said attenuator means to vary its position in relation to the said first axis.

5. The combination of claim 2, wherein said servo-control means comprises:

means for deviating said light pulses away from and back to said first axis for a trajectory portion of said pulses, which trajectory portion intersects said portion of said attenuator, and means for causing said trajectory portion to be rotated about said first axis.

6. The combination of claim 5, wherein said means for deviating comprises:

a first plane reflector and a second plane reflector placed on the said first axis and limiting the said deviated part of the said trajectory;

a third plane reflector and a fourth plane reflector placed on a third axis different from the said first axis, the said portion of the said attenuator means being placed on said third axis between said third and fourth reflectors, said four plane reflectors being fast mechanically with respect to one another, said pulses emitted by the said generator being reflected successively on the first, third, fourth and second reflectors; and wherein said means for causing comprises means for rotating the combination of said four plane reflectors about said first axis.

7. The combination of claim 5, wherein said means for deviating comprises:

a first plane reflector and a second plane reflector, fast mechanically with one another, placed on the said first axis and limiting the said deviated part of the said trajectory;

a concave spherical reflector having a center of curvature situated on said first axis between the said first and second plane reflectors, the pulses of the said generator being reflected successively on said first plane reflector, said spherical reflector and said second plane reflector, the said portion of the said attenuator being placed between said spherical reflector on the one hand and said first and second plane reflectors, on the other hand;

a convergent optical system centered on the said first axis and situated on the side of the said second plane reflector opposite to the said first plane reflector, a focal point of said optical system along said trajectory being in coincidence with a point in the focal plane of said spherical reflector; and wherein said means for causing comprises means for rotating said first and second plane reflectors about said first axis.

* * * * *